United States Patent [19]
Roberts et al.

[11] Patent Number: 4,557,024
[45] Date of Patent: Dec. 10, 1985

[54] CLAMP FOR HOSE, TUBING, OR THE LIKE

[75] Inventors: George E. Roberts, Fort Lauderdale, Fla.; Robert L. Waddington, London, England

[73] Assignee: 501 Evelyn Investments Ltd., New York, N.Y.

[21] Appl. No.: 577,293

[22] Filed: Feb. 6, 1984

[51] Int. Cl.$^4$ .............................................. F16L 33/22
[52] U.S. Cl. ................................ 24/20 TT; 24/16 R; 24/20 EE; 24/23 EE
[58] Field of Search ........... 24/20 TT, 20 EE, 23 EE, 24/272, 271, 274 R, 20 R, 16 PB, 17 AP, 543, 279, 19, 16 R, 17 A; 285/DIG. 22

[56] References Cited

U.S. PATENT DOCUMENTS

| | | | |
|---|---|---|---|
| 1,441,154 | 1/1923 | Johnson | 24/20 TT |
| 1,896,601 | 2/1933 | Andrews | 24/17 A |
| 2,318,816 | 5/1943 | Tinnerman | 24/20 TT |
| 2,979,794 | 4/1961 | de Bartolo | 24/17 |
| 3,229,998 | 1/1966 | Pennington | 24/16 R |
| 3,605,200 | 9/1971 | Vallinotto | 24/20 TT |
| 3,913,187 | 10/1975 | Okuda | 24/255 |
| 3,925,851 | 12/1975 | Bevans | 24/20 TT |
| 4,128,918 | 12/1978 | Wenk | 24/16 R |
| 4,183,120 | 1/1980 | Thorne | 24/16 R |
| 4,214,351 | 7/1980 | Wenk | 24/255 SL |
| 4,306,740 | 12/1981 | Kleykamp et al. | 24/20 TT |
| 4,312,525 | 1/1982 | Kleykamp | 285/236 |
| 4,372,011 | 2/1983 | Aranyos | 24/20 TT |
| 4,453,289 | 6/1984 | Kleykamp et al. | 24/20 TT |
| 4,483,556 | 11/1984 | Livolsi | 24/20 TT |

FOREIGN PATENT DOCUMENTS

| | | |
|---|---|---|
| 1241671 | 6/1967 | Fed. Rep. of Germany . |
| 1559036 | 3/1969 | France . |
| 1236294 | 6/1971 | United Kingdom . |
| 1600601 | 10/1981 | United Kingdom . |

Primary Examiner—Victor N. Sakran
Attorney, Agent, or Firm—Pennie & Edmonds

[57] ABSTRACT

A unitary, flexible, and resilient clamp for applying clamping forces to the exterior surface of objects such as coolant hoses, tubes, or the like. The clamp has a generally arcuate cross-sectional configuration and includes a flexible band in the form of an open ring having opposed end portions and defining an inner arcuate portion. A first band end is connected to a first end portion of the flexible band and includes at least three inwardly projecting extensions. A second band end is connected to the opposite end portion of the flexible band and includes at least two extensions projecting inwardly towards the extensions of the first band end and configured to matingly engage therewith. The inwardly projecting extensions include correspondingly positioned pairs of mating teeth and are configured, positioned, and oriented such that when the band ends are moved towards each other the extensions become progressively matingly engaged with each other in a manner to maintain the clamp in a closed position such that the clamp assumes a cross-sectional shape corresponding to the cross-sectional configuration of the hose or object to be clamped and contacts its surface, providing uniformly distributed, stable and substantial clamping pressures.

50 Claims, 16 Drawing Figures

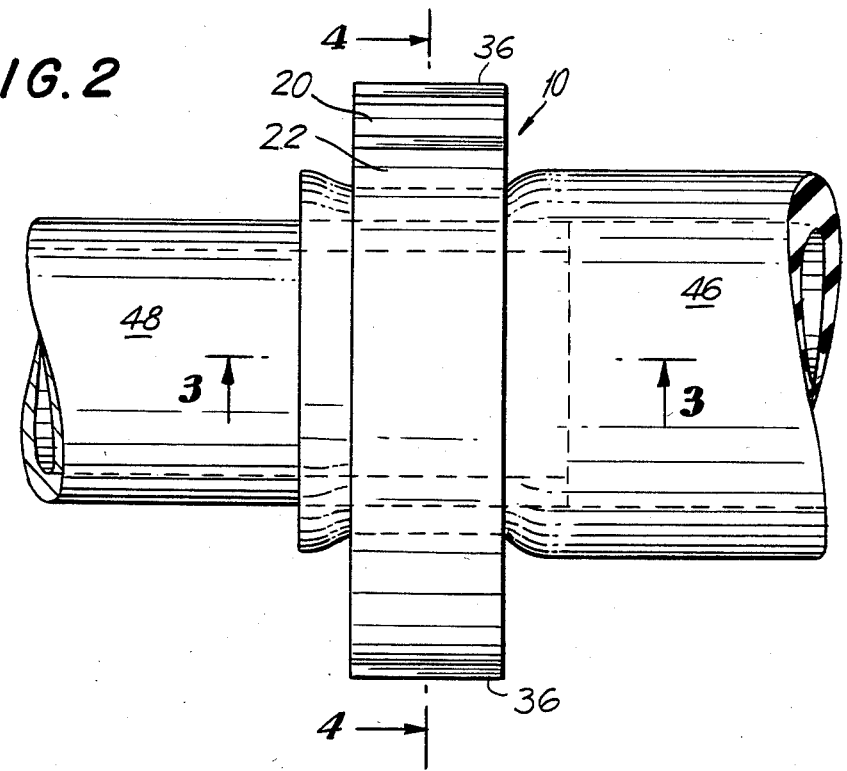
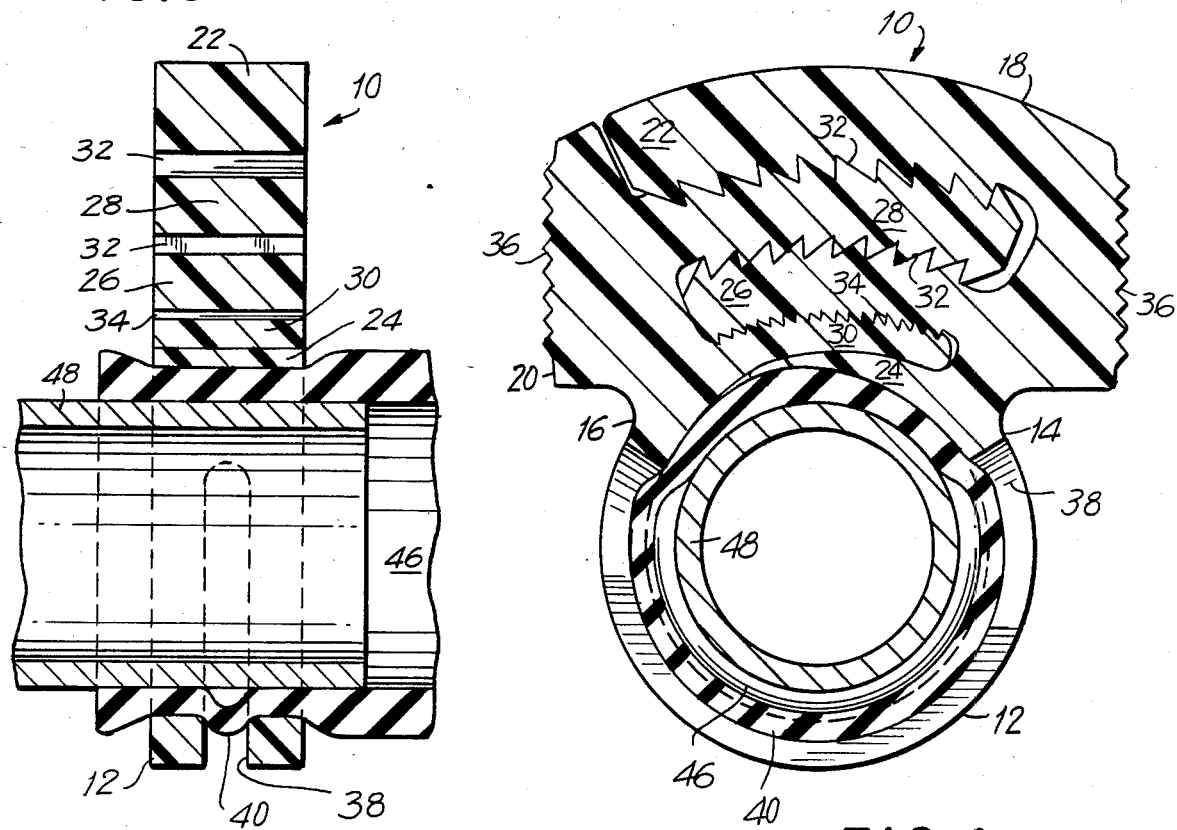

FIG. 15
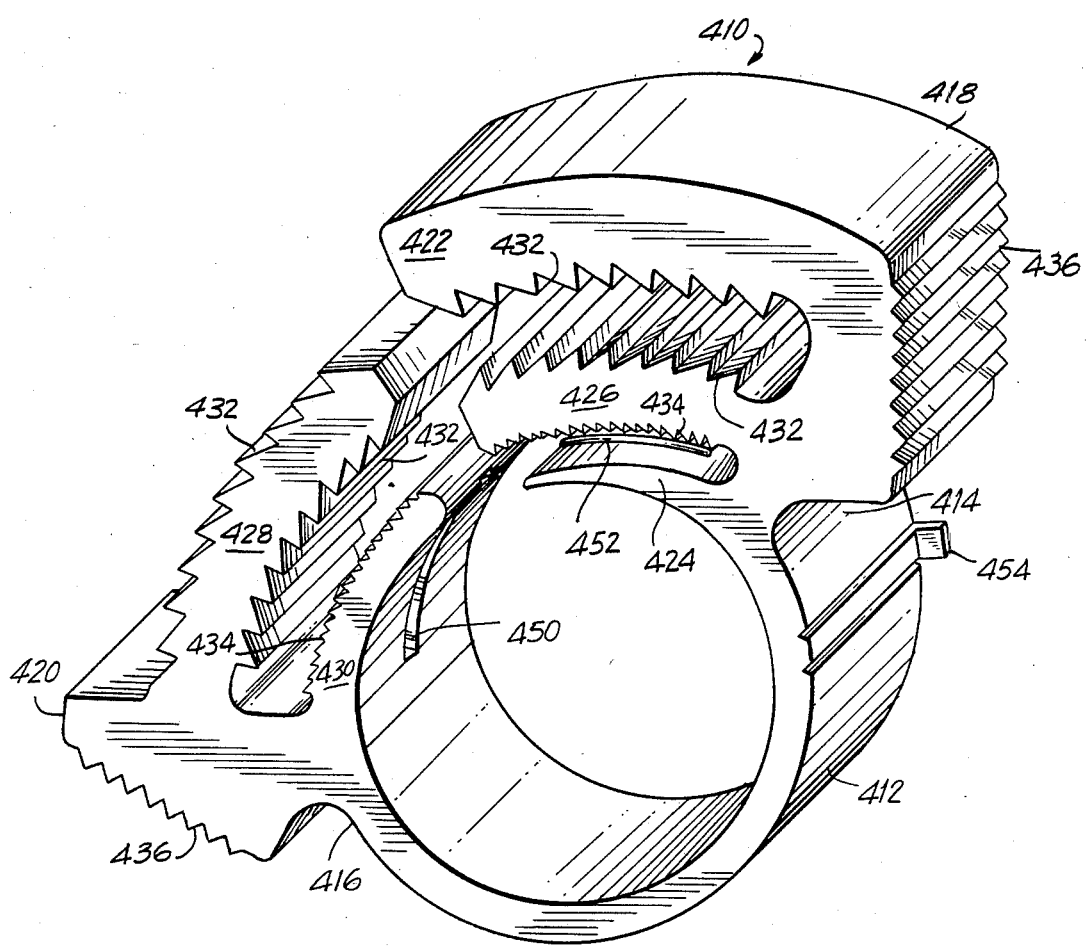
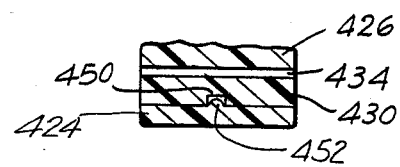
FIG. 16

CLAMP FOR HOSE, TUBING, OR THE LIKE

BACKGROUND OF THE INVENTION

1. Technical Field

The present invention relates to a unitary, flexible, and resilient clamp for applying pressure to the outer surface of objects such as hoses, tubes or the like.

2. Description of the Prior Art

Single piece plastic hose clamps employing interlocking jaws and tongues are known. Multiple component clamps are also known. Examples of some one-piece, adjustable hose clamps are particularly described in U.S. Pat. Nos. 3,605,200 to Valinotto et al., 3,925,851 to Bevans, 4,128,918 to Wenk, 4,372,011 to Aranyos and British Pat. No. 1,600,601.

U.S. Pat. No. 3,605,200 to Valinotto et al. relates to a clamp for fastening a sleeve or collar on a tubular pipe. U.S. Pat. No. 3,925,851 to Wenk relates to a plastic hose clamp embodying in combination, an open ended hose-surrounding band and a clamping assembly. U.S. Pat. No. 4,128,918 to Wenk discloses a snap-on clamp for fastening objects such as flexible hose about a pipe. U.S. Pat. No. 4,372,011 to Aranyos discloses a flexible band clamp or clip for securing articles such as pipes or wires. British Pat. No. 1,600,601 discloses a clip for securing hosepipes which comprises a band for encircling the article to be secured. One end of the band contains a serrated tongue while the other end contains a pair of matching serrated jaws.

While these prior art clamps include open annular bands having interlocking jaw members at their ends, they are limited with respect to the range of outer hose diameters about which a single clamp is capable of being secured. Furthermore, these clamps are not capable of maintaining sufficient and uniformly distributed clamping forces about the object to be clamped in certain applications. In addition, these prior art clamps are deficient with respect to their ability to remain in a closed condition when subjected to vibration or other forces which would disengage the clamp.

SUMMARY OF THE INVENTION

The present invention relates to a unitary flexible and resilient clamp for applying clamping forces to the exterior surface of an object such as a rubber hose or tube, having a generally arcuate cross-sectional configuration. This clamp has a flexible band in the form of an open ring having opposed end portions and defining an inner arcuate portion. A first band end is connected to a first end portion of the flexible band and includes at least three inwardly projecting extensions. A second band end is connected to the opposite end portion of the flexible band, and includes at least two extensions projecting inwardly toward the extensions of the first band end and configured to matingly engage therewith. These inwardly projecting extensions are configured, positioned, and oriented such that when the band ends are moved toward each other, the extensions become progressively matingly engaged with each other in a manner to maintain the clamp in a closed condition. Thus, the inner arcuate portion of the flexible band then assumes a cross-sectional configuration corresponding to the cross-sectional configuration of the object to be clamped and contacts its outer surface thereof.

Another embodiment of the present invention is directed to a clamp for applying clamping forces to the exterior surface of an object having a generally circular cross section. In this embodiment, the clamp comprises a flexible band in the form of an open ring having opposed end portions and defining an inner arcuate portion which is at least partially discontinuous. A first band end is connected to a first end portion of the flexible band and includes at least three inwardly projecting extensions. A second band end is connected to the opposite end portion of the flexible band and includes at least two extensions projecting inwardly toward the extensions of the first band end and configured to matingly engage therewith. These inwardly projecting extensions are configured, positioned, and oriented such that when the band ends are moved toward each other, the extensions become progressively matingly engaged with each other in a manner to maintain the clamp in a closed condition. Thus, the inner arcuate surface portion of the flexible band is generally circular for contact with the object to be clamped.

The clamp according to this embodiment has the inwardly projecting extensions of the first band end positioned in relatively upper, intermediate, and lower positions, the lower position being closest to the center of the flexible band. The inwardly projecting extensions of the second band end are correspondingly positioned in relatively upper and lower positions. The upper and intermediate extensions on the first band end along with the upper and lower extensions on the second band end each include a plurality of teeth on at least one side, while the lower extension on the first band end is tapered and toothless. These teeth are arranged so as to firmly engage each other to maintain the clamp in a closed position. It is advantageous to dimension the teeth on the upper side of the lower extension of the second band end and the teeth on the lower side of the intermediate extension of the first band end to have a height which is less than the height of the teeth on the other extensions. Preferably the height of these smaller teeth is less than or approximately one-half the height of the teeth on the other extensions.

A further embodiment of this invention relates to a clamp which includes a flexible band in the form of an open ring having opposed end portions and defining an inner arcuate surface which is at least partially discontinuous. A first band end is connected to a first end portion of the flexible band and includes at least three inwardly projecting extensions positioned in relatively upper, intermediate, and lower positions. A second band end is connected to the opposite end portion of the flexible band and includes at least two inwardly projecting extensions positioned in relatively upper and lower positions and configured to matingly engage with the extensions of the first band end. The lower side of the upper extension on the first band end and the upper side of the upper extension on the second band end each have a plurality of teeth. The lower extension on the first band end is tapered and toothless, and the remaining extensions are toothless. The inwardly projecting extensions are configured, positioned, and oriented such that when the band ends are moved toward each other, these extensions become progressively matingly engaged with each other in a manner to maintain the clamp in a closed condition. Thus, the inner arcuate surface is substantially circular for pressure contact with the exterior surface of the elongated object.

An alternate version of this embodiment includes a plurality of teeth on the upper side of the lower extension of the second band end and the lower side of the intermediate extension of the first band end in addition to the teeth on the lower side of the upper extension on the first band end and the upper side of the upper extension on the second band end. These teeth, which are arranged so as to firmly engage each other to maintain the clamp in a closed position, have a generally triangular shape as viewed along the axial direction of the object. The object generally aligns with the center of the flexible band when the clamp is in a closed position.

For ease and convenience in closing the clamp, it is advantageous to dimension the height of the teeth on the upper side of the lower extension of the second band end and the height of the teeth on the lower side of the intermediate extension of the first band end to be less than the height of the teeth on the other extensions, with a height of less than or approximately one-half the height of the teeth on the other extensions being preferred. The smaller teeth facilitate a finer degree of tightening of the inner portion of the clamp without affecting the engagement of the larger teeth which are spaced outwardly radially therefrom.

Another feature of the present invention relates to the provision of a discontinuity in the inner arcuate surface portion of the flexible band of the clamp, such discontinuity being in the form of an indentation or aperture extending through the band. It is advantageous for this discontinuity to be in the form of an elongated aperture extending approximately from the first end portion of the flexible band to approximately the second end portion of the flexible band such that the band in effect, acts as a dual band on the object to be clamped.

An additional feature of this invention relates to the provision of means for gripping and applying inwardly directed forces to close the clamp. Such means for gripping the band ends can be in the form of corrugations positioned at opposed locations on the band ends.

Another feature of the present inventive clamp relates to the provision on the first band end of means to prevent disengagement of the teeth in a direction perpendicular to the direction of engagement of the teeth. Such disengagement means may be in the form of a membrane located on one side of at least one band end extending across the extensions of the band end and oriented generally perpendicular to the axis of the object to be clamped. Alternately, such means may be in the form of a tapering of at least one pair of opposed mating surfaces of the extensions (i.e. the teeth and/or the toothless or smooth surfaces of the extensions) in a direction generally perpendicular to the direction of engagement of the extensions to resist or prevent (depending on the degree of taper) movement of the band ends in a direction parallel to the axial direction of the object to be clamped.

For relatively permanent applications, at least two pairs of opposed mating surfaces may be oppositely tapered to resist or prevent movement or disengagement of the band ends in either direction. Alternately, combinations of mating teeth and/or engaging surfaces of the extensions may be oppositely tapered in a like manner to provide the same effect. This feature may also incorporate a molded tear-tab in the flexible band for removal of the clamp by physically tearing the band at the location of the tear-tab, if desired.

Another feature of the invention which provides resistance to movement of the band ends in either direction parallel to the axial direction of the object to be clamped is the arrangement of a guide groove on one surface of an extension and a bead or dimple on the mating surface of an oppositely positioned extension. This guide groove and bead or dimple must be located on toothless extensions, and the lower extension on each band end is preferred.

The tapered lower extension on the first band end is substantially flush with the arcuate inner surface of the opposed end portion when the clamp is in a closed position. This provides the clamp with a substantially continuous and circular inner surface throughout the entire closing range of the clamp. The movement of this extension is therefore not restricted as closing forces are applied to the clamp. Moreover, this extension slides smoothly between the lower extension of the second band end and the object to be clamped, thus progressively increasing the clamping effect. This arrangement permits the clamp to evenly distribute pressure about the object, and when the object is a hose, such as an automobile coolant hose, and it permits the clamp to withstand high internal hose pressure throughout the full diameter closing range of the clamp.

The clamp is preferably constructed of a flexible, resilient material, preferably plastics such as nylon, polypropylene, polyesters, acetals, or the like. Also, such flexible, resilient, strong materials such as metals including steel, stainless steel or the like are contemplated where required by the particular installation.

As can be seen from the above, an improved flexible and resilient clamp for hoses, tubes or the like has been devised having unique features and unexpected clamping characteristics. The clamp of the present invention is capable not only of being quickly and tightly secured about a hose or other object, but it can withstand extremely high internal hose pressure without failing or leaking. Furthermore, the clamp of the present invention is able to accommodate hoses having varying outer diameters. Several embodiments of the invention permit easy removal and re-use, if necessary, but do not become detached from the clamped hose or other object by transverse shear forces as is the case with prior art clamps. Furthermore, the manufacture of the clamp according the present invention, and as defined hereinbelow with reference to the drawings, will provide stronger and more effective securing relationship than other prior art clamps.

Although described in the context of circular hose clamps, it should be understood that the principles of the present invention can also be applied to provide an improved economical clamp capable of fastening, holding, or clamping irregular shaped, elliptical shaped, or non-circular shaped objects. This would include conduit, wire, cable, rope, or a variety of other arcuately configured objects too numerous to include here. In such instances, the band of the clamp can be manufactured to conform and evenly apply pressure to various and numerous shapes, or to provide sufficient force for mounting, stablizing, or securing the object or objects to be clamped.

BRIEF DESCRIPTION OF THE DRAWINGS

Preferred embodiments of the invention will be described hereinbelow with reference to the drawings wherein:

FIG. 2 is a side elevational view of the clamp shown in FIG. 1, illustrating the clamp in a closed position around a hose or pipe;

FIG. 3 is a side elevational view partially in cross section, taken along line 3—3 of FIG. 2;

FIG. 4 is a cross-sectional view taken along line 4—4 of FIG. 2;

FIG. 15 is a front perspective view of still another embodiment of the clamp of the invention; and FIG. 16 is a cross-sectional view illustrating a significant feature of the clamp of FIG. 15, when in a closed condition.

BEST MODE FOR CARRYING OUT THE INVENTION

Figure 1:
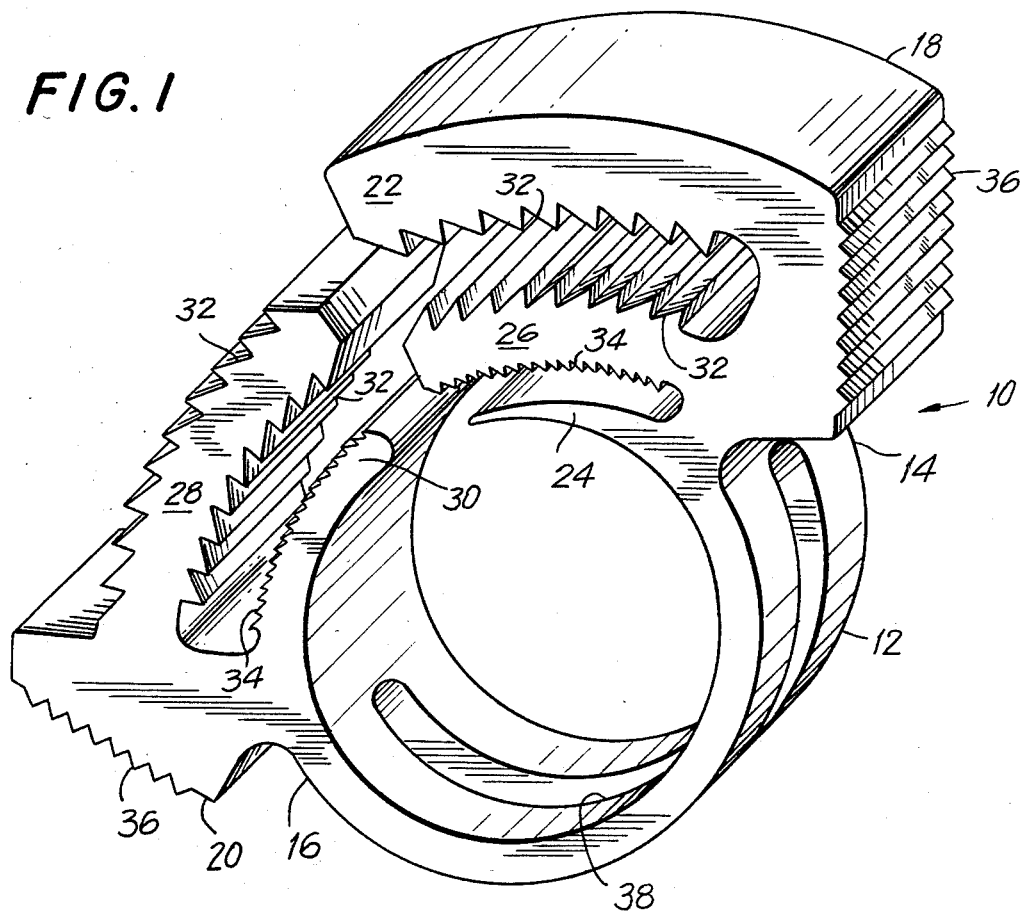
FIG. 1 is a front perspective view of a clamp constructed according to the present invention in an open position.

Referring to FIG. 1, there is illustrated a unitary, flexible, and resilient clamp 10 constructed according to the invention. The clamp includes a band 12 pre-shaped in the form of an open flexible ring having somewhat of an oval shape in the opened condition to allow for the insertion of an object to be clamped, such as a hose or tube. The clamp 10 can then be closed to a circular shape by bringing the band end portions 14 and 16 and band ends 18 and 20 together to their respective engaged positions as shown in FIG. 4.

One band end 18 consists of an upper extension 22, a lower extension 24, and an intermediate extension 26, while the opposite band end 20 has only an upper extension 28 and lower extension 30. Band end 20 has two sets of large teeth 32, one row on each side of extension 28. One set of smaller teeth 34 is provided on the top side of extension 30. The space between extensions 28 and 30 is dimensioned to receive intermediate extension 26 of band end 18 which has large teeth 32 on the top side and complimentary smaller teeth 34 on the bottom side. The lower side of extension 22 on band end 18 also has large teeth 32.

Figure 5:
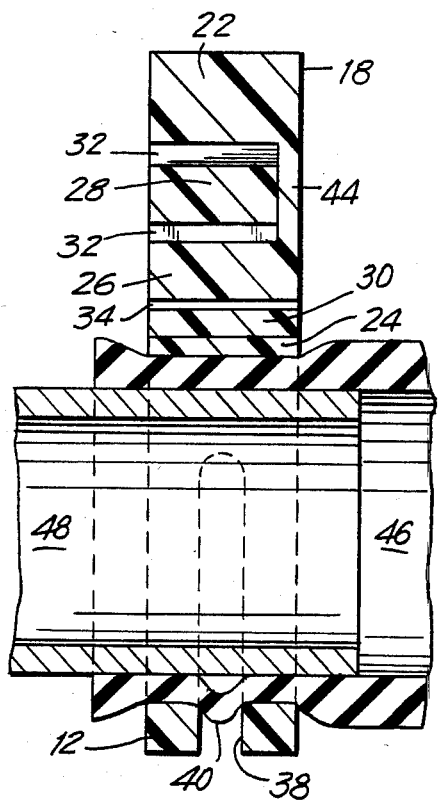
FIG. 5 is a side elevational view partially in cross section, of an alternate embodiment of the clamp of the invention.

When the band ends 18 and 20 are brought together, extensions 28 and 30 of band end 20 receive intermediate extension 26 of band end 18, and respective upper and lower (i.e. with respect to the center of the band 12) extensions 22 and 24 of band end 18 correspondingly receive extension 28 as shown in FIG. 5. In this condition, the smooth surface of the bottom side of extension 30 of band end 20 slidably receives the upper smooth surface of extension 24 of band end 18.

The lower smooth surface of extension 24, in combination with a portion of the lower smooth surface of extension 30 of band end 20 provides a substantially round, inner circle of the clamp when the clamp is closed. Extension 24 also prevents any exposed teeth 34 on the bottom side of intermediate extension 26 from exposure to the item to be clamped. Also, lower extension 24 of band end 18 does not actually engage or provide any clamping forces to the overall clamping mechanism.

Band ends 18, and 20 also contain grips or corrugations 36 on their respective outer portions to facilitate engaging the clamp manually or with the aid of a suitable tool. In addition, the inner surface of band 12 is provided with at least one discontinuity shown in the form of an elongated aperature 38, so that it, in effect, acts as a dual band clamp.

Referring now to FIG. 2 there is shown the clamp of FIG. 1 in a closed position around a suitable conduit 46 which must be clamped onto another conduit 48. The conduits may be any type of hoses, tubes etc., such as automobile rubber water hose 46 and metal radiator pipe 48.

FIG. 3 illustrates the pressure applied to the exterior surface of rubber hose 46 including the relief 40 of the hose through the elongated aperture 38. This illustrates the ability of the flexible band 12 to act, in effect, as a double band, which provides improved gripping of the hose. Referring now to FIG. 4, there is illustrated the engagement of the large teeth 32, and the small teeth 34 of the respective mating extensions of the clamp 10 when in a closed position.

Referring now to FIG. 5, there is illustrated an alternate embodiment of the clamp of the invention which includes a feature to prevent disengagement in one of the sideways directions (i.e. parallel to the axis of the item to be clamped). This prevention against disengagement is achieved through the use of a stop or membrane 44 which allows the clamp to be taken apart in only one of these directions.

Figure 7:
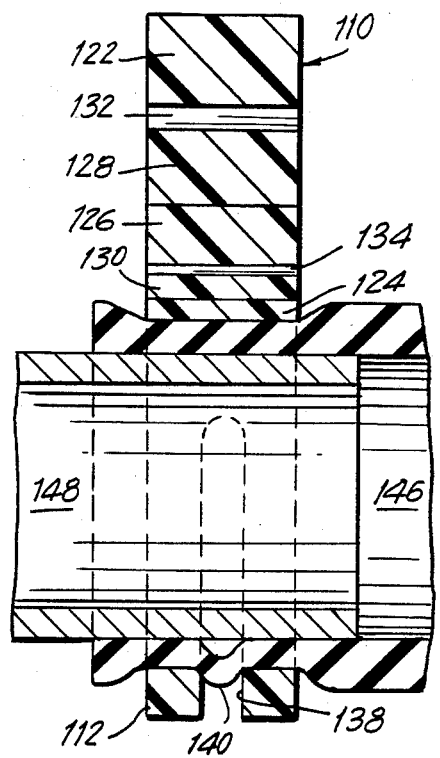
FIG. 7 is a side elevational view partially in cross section, of the clamp of FIG. 6 in a closed position around a hose or pipe.
Figure 8:
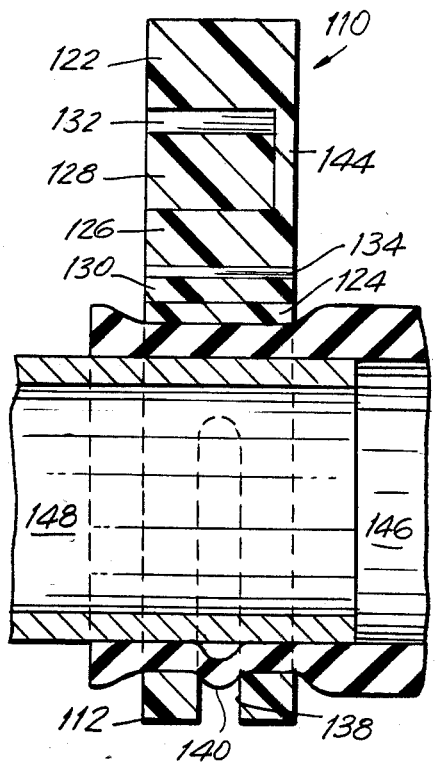
FIG. 8 is a side elevational view partially in cross section, illustrating another embodiment of the invention.
Figure 9:
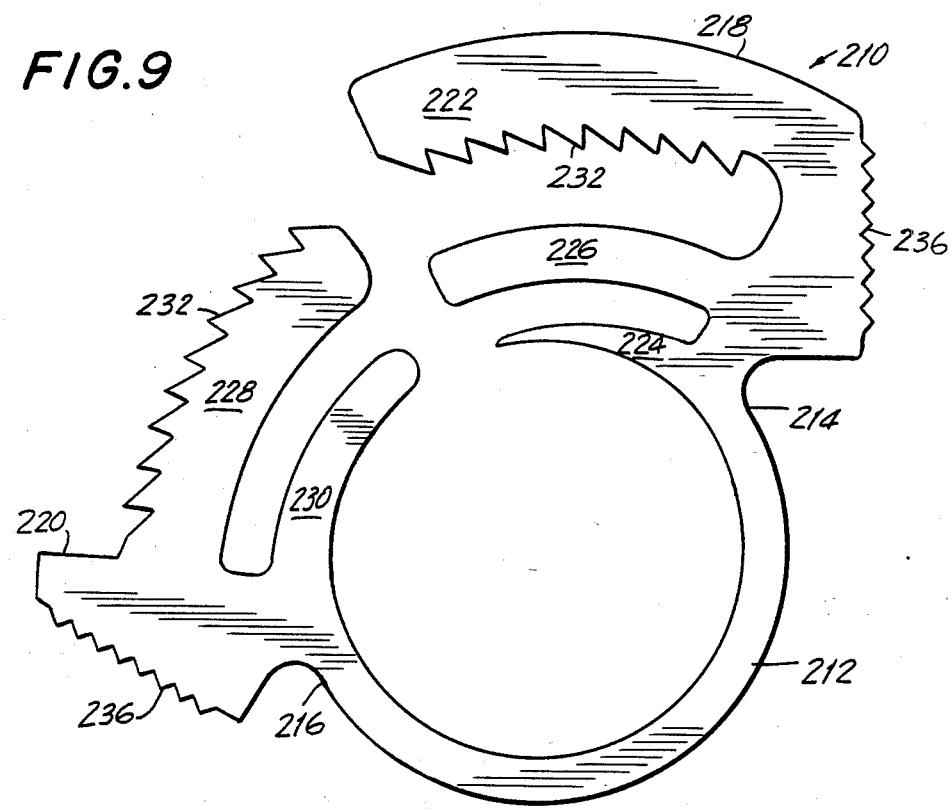
FIG. 9 is a front view of another embodiment of the clamp constructed according to the invention.
Figure 10:
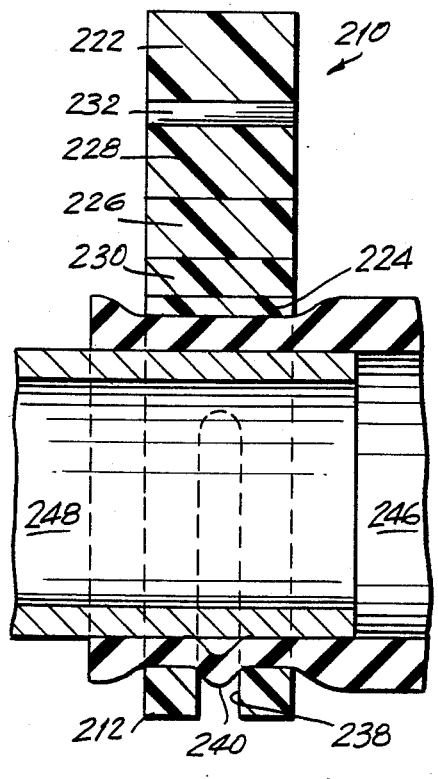
FIG. 10 is a side elevational view partially in cross section, of the clamp of FIG. 9, illustrating still another embodiment of the invention.
Figure 11:
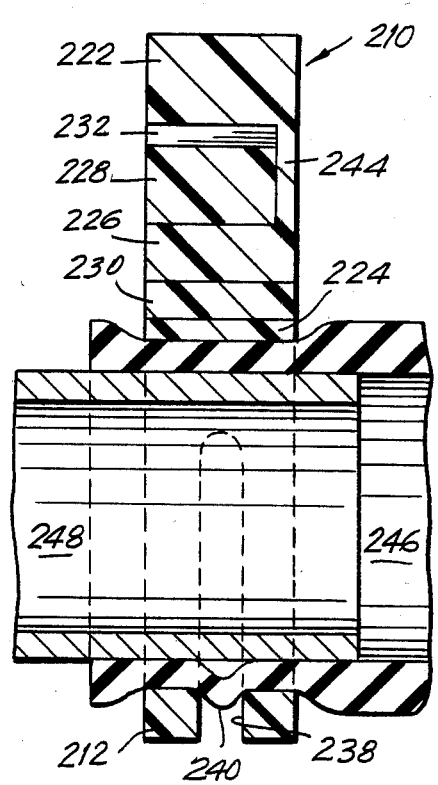
FIG. 11 is a side elevational view partially in cross section, of the clamp of FIG. 9, illustrating a further embodiment of the invention.

Referring now to FIGS. 6–8 and FIGS. 9–11 there is illustrated several alternate embodiments of the clamp of the invention which are similar in many respects to the embodiments of FIGS. 1–5 described hereinabove. Accordingly, in the illustration and description of the embodiment of FIGS. 6–8, elements corresponding to like elements of the embodiments of FIGS. 1–5 bear like numbers but have "100" added. In a similar manner elements of the embodiment of FIGS. 9–11 will bear the same number as like elements of FIGS. 1–5 but will have "200" added to them. Accordingly, the element of the embodiment of FIGS. 6–8 corresponding to element 12 of the first embodiment is identified by the numeral "112", while the like element of FIGS. 9–11 is identified by the numeral "212".

Figure 6:
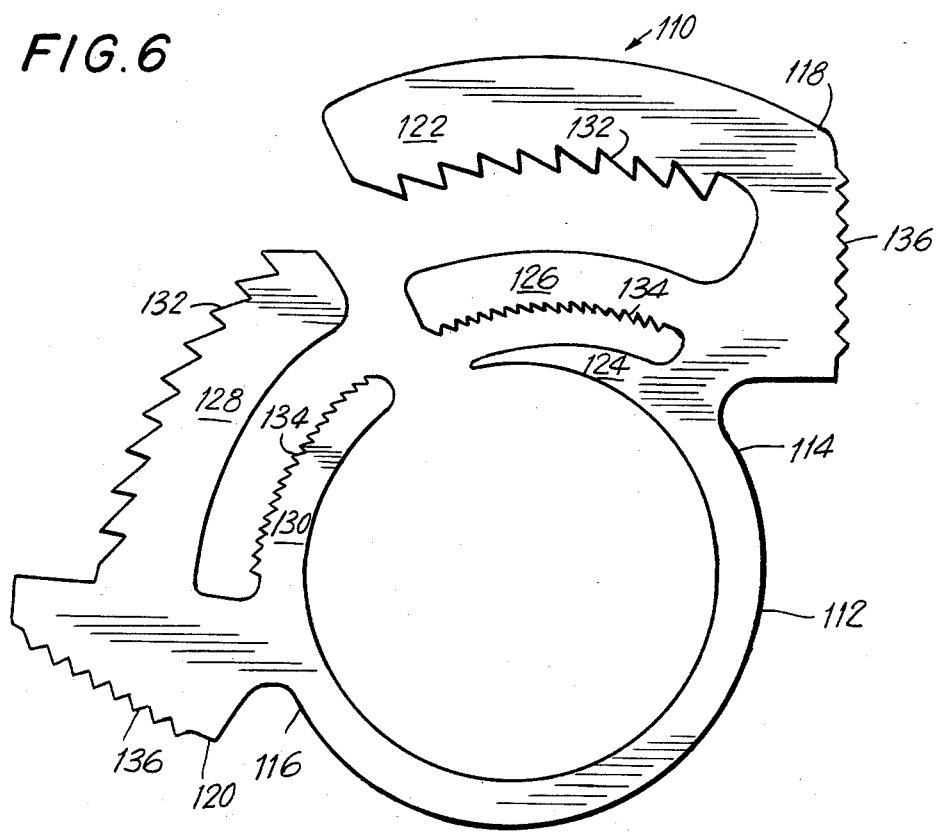
FIG. 6 is a front view of another embodiment of the embodiment of the clamp constructed according to the invention.

Referring now to FIGS. 6, clamp 110 includes a flexible band 112, band end portions 114, 116, band ends 118, 120, extensions 122, 124, 126, 128, and 130, teeth 132, 134, and gripping means 136. However, in the embodiment of FIG. 6, the top side of extension 126 and the bottom side of extension 128 are smooth and toothless in comparison to the toothed surfaces of FIG. 1. FIG. 7 is similar to FIG. 3 and illustrates the clamp 110 in a closed position around rubber hose 146 and metal tube 148, while FIG. 8 is similar to FIG. 7 except that it illustrates the optional stop or membrane 144. It will be appreciated that the band of FIG. 6 provides improved clamping forces and uniform distribution of such forces about the hose or tube, similar to the capability of the structure illustrated in FIGS. 1–5 as described hereinabove.

Referring now to FIGS. 9–11 there is illustrated still another preferred embodiment of the invention. The clamp 210 of these FIGS. includes a flexible band 212, band end portions 214, 216 band ends 218, 220, extensions 222, 224, 226, 228, and 230, teeth 232, and gripping means 236. However, in the embodiment of FIG. 9, the top side of extension 230 and the bottom side of extension 226 are smooth and toothless in comparison to the toothed surfaces of FIG. 6. Thus, the only teeth 232 appearing in this clamp 210 would be on the lower side of extension 222 and the upper side of extension 228. The smooth surfaces of extensions 224, 226, and 230 may alternately incorporate guide features and/or additional locking features if desired, such as a guide aperture and dimple or a guide groove and bead of the type which will be described hereinbelow with reference to FIGS. 15 and 16. Moreover, it will be appreciated that the clamp shown in FIG. 9 provides significant clamping and force distribution advantages over the prior art.

FIG. 10 is similar to FIG. 7 and illustrates the clamp 210 in a closed position around rubber hose 246 and metal tube 248, while FIG. 11 is similar to FIG. 8 and illustrates the optional stop or membrane 244.

Figure 12:
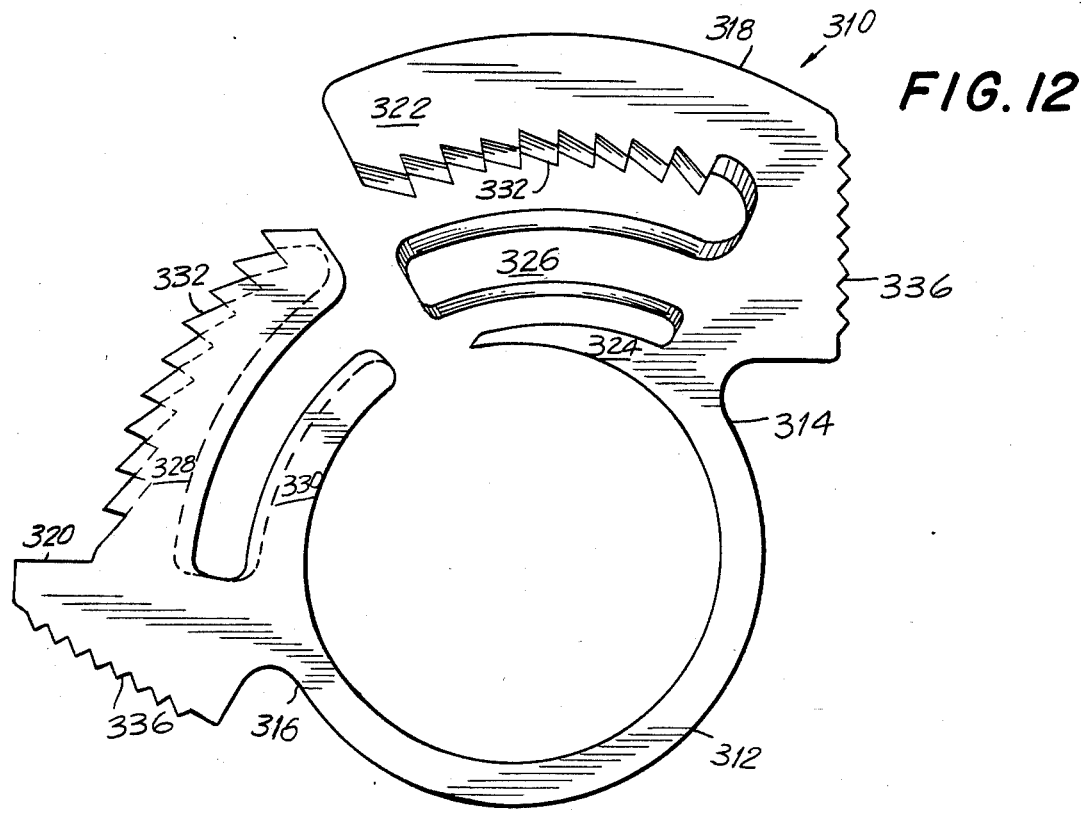
FIG. 12 is a front view of still another embodiment of the invention.
Figure 13:
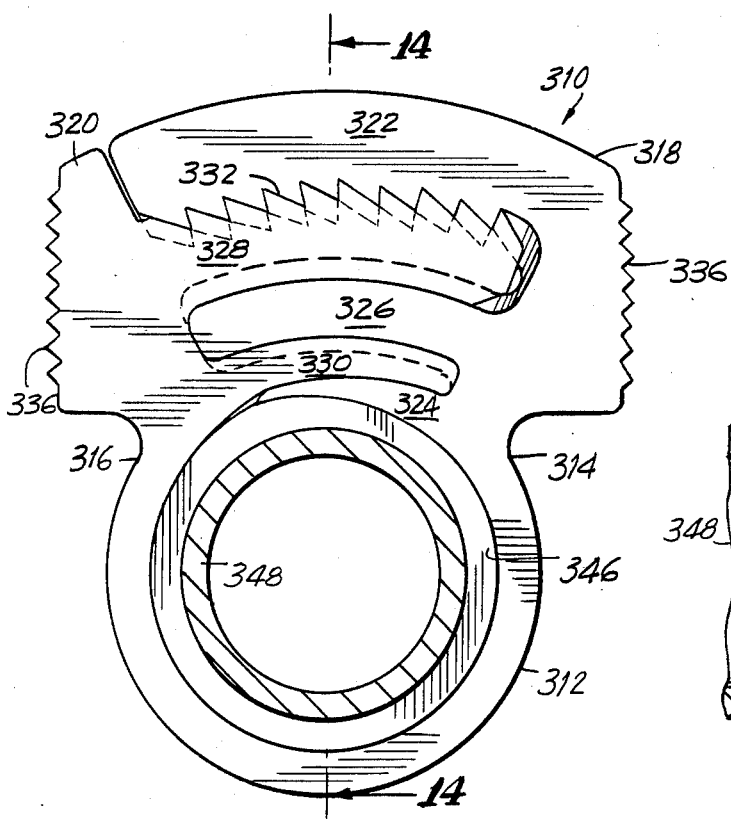
FIG. 13 is a front cross-sectional view of the clamp shown in FIG. 12 in a closed position around a hose or pipe.
Figure 14:
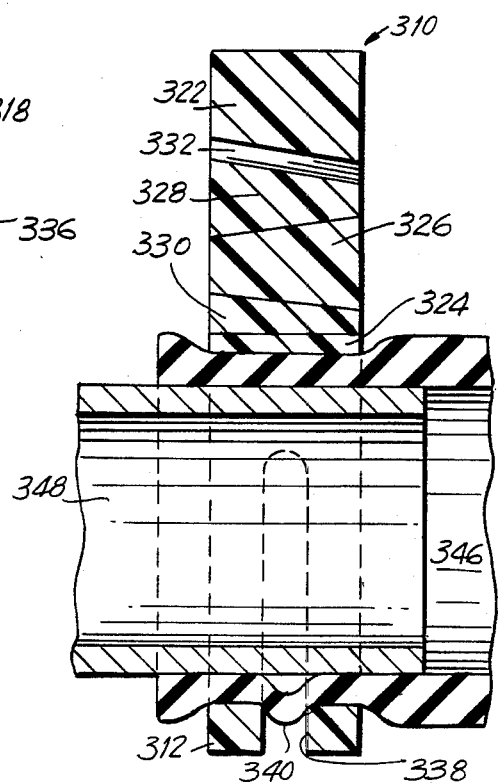
FIG. 14 is a cross-sectional view taken along line 14—14 of FIG. 13.

FIGS. 12–14 illustrate another variation of the clamp of FIGS. 9–11. Accordingly as noted hereinabove, in the description of the embodiment of FIGS. 12–14, elements corresponding to like elements of FIGS. 9–11 bear like numbers, but will be of the "300" series. Thus, the element of the embodiment of FIGS. 12–14 corresponding to element "212" of the embodiment of FIGS. 9–11 will be identified by the numeral "312".

Referring now to FIGS. 12–14, prevention of disengagement of the clamp 310 in one of the sideways directions is accomplished by tapering the teeth of the extensions. Although FIG. 12 only shows teeth 332 on the lower side of extension 322 and the top side of extension 328, it will be appreciated that the same effect with respect to tapering the teeth can be achieved for the clamps of FIGS. 1 or 6 which disclose additional sets of teeth. In addition, sideways disengagement in both directions can be resisted or even prevented by providing respective sets of mating teeth which are tapered in opposite directions (not shown)—or by oppositely tapering suitable combinations of teeth and/or smooth surfaces of the extensions—for those installations which are considered to be of a permanent or relatively permanent nature. The degree of resistance can be controlled by the degree of the tapers.

FIG. 15 illustrates a variation of the clamp of FIG. 1. Accordingly, in the description of the embodiment of FIG. 15, elements corresponding to like elements of FIG. 1 bear like numbers but will have "400" added. Thus, the element of the embodiment of FIG. 15 corresponding to element "12" of the embodiment of FIG. 1 will be identified by the numeral "412".

Referring once again to FIG. 15 clamp 410 is similar to clamp 10 of FIG. 1. In this embodiment, the flexible band 412 is shown with a smooth inner surface. As will be appreciated by those skilled in the art, the clamp 410 of FIG. 15 can be manufactured with either a membrane or tapered teeth to resist or prevent disengagement in one or both sideways directions. Furthermore, the clamp 410 of FIG. 15 can be manufactured without teeth on either the upper surface of extension 426 and the lower surface of extension 428, the lower surface of extension 426 and the upper surface of extension 430, or both.

Extension 430 includes guide groove 450 and extension 424 includes mating guide bead 452 to guide the band ends into alignment when the band is being closed. This feature also provides resistance to sideways movement in either direction similar to the function of the oppositely tapered surfaces described hereinabove. Alternately, guide bead 422 may be in the form of a dimple (not shown).

It will be appreciated by those skilled in the art from the several embodiments of the present invention that each embodiment includes advantages both in structure and function which are common to the advantages of the remaining embodiments. The present invention provides substantially improved clamping forces and resulting pressures on the object to be clamped, stability and continuous maintenance of the clamped condition, a dual band clamping effect about the object, ready engagement and disengagement of the clamp, ease of manufacture, unitary structure, etc. In addition, the optional features described hereinabove and the combination of the various features of the present invention will be apparent to those skilled in the art.

As noted the clamp may be constructed either for situations where disengagement may be readily achieved or for permanent installations wherein normal disengagement is prevented or not required. In some instances it will be appreciated that the clamp can be constructed as a disposable clamp wherein disengagement by relative movement in any sideways direction may be resisted or even prevented, but disengagement may still be achieved by destruction of the clamp. In such an instance, a portion of the band of the clamp may be constructed to include means for disengagement, such as tear tab 454, which will not reduce the clamping capability of the device but which would allow the clamp to be conveniently removed, such as by pulling the tear tab which would physically tear a portion of the band of the clamp. The normal force carrying capability of the clamp will not be affected in such case.

The clamps may be manufactured from a variety of materials including but not necessarily limited to plastics, metals or alloys, or any other suitable materials. It has been found that the preferred materials for most applications are various injection moldable plastic or thermoplastic materials having the following combination of properties:

(a) relatively high heat resistance,
(b) high tensile strength,
(c) high impact strength at both high and low temperatures, and
(d) resistance to a variety of chemicals.

In addition, the selected materials should preferably be sufficiently flexible to readily conform to the shape of the object to be clamped and sufficiently resilient to allow for tooth engagement and clamp closure.

Included among the plastic materials which can be used for manufacturing clamps according to the present invention are nylon, glass-filled nylon, polystyrene and styrene copolymers, polyethylene, polypropylene and ethylene-propylene copolymers, acrylonitrile-butadiene styrene copolymers, polyvinyl chlorides and copolymers of vinyl chloride with various monmers, ethylene-vinyl acetate copolymers, polyesters, acetals, polycarbonates, polysulfone, polyphenylene oxide, and various other known engineering thermoplastics. It is believed that nylon generally offers the desired balance of heat and chemical resistance, strength, and economy, and is particularly preferred for clamp construction.

While it is apparent that the invention herein disclosed is capable of providing the above described advantages over prior art clamps, it will be appreciated that numerous modifications and combinations may be devised by those skilled in the art, and it is intended that the appended claims cover all such modifications and embodiments as may fall within the true spirit and scope of the present invention.

We claim:

1. A unitary clamp for applying clamping forces to the exterior surface of an object having a generally arcuate cross-sectional configuration, which comprises:
   (a) a flexible band in the form of an open ring having opposed end portions and defining an inner arcuate portion;
   (b) a first band end connected to a first end portion of said flexible band, said first band end including at least three inwardly projecting extensions; and
   (c) a second band end connected to the opposite end portion of said flexible band, said second band end including at least two extensions projecting inwardly toward said extensions of said first band end and configured to engage therewith, said inwardly projecting extensions being configured, positioned, and oriented such that when said band ends are moved toward each other, said extensions become engaged with each other in a manner to maintain the clamp in a closed condition whereby said inner arcuate portion of said flexible band assumes a cross-sectional configuration corresponding to the cross-sectional configuration of the object to be clamped and contacts the outer surface thereof, and wherein said inwardly projecting extensions of said first band end are positioned in relatively upper, intermediate, and lower spaced positions, the lower position being closest to the center of the flexible band, and the spacing being sufficient to engagingly receive the extensions of said second band end.

2. The clamp according to claim 1 wherein said at least two extensions of said second band end are configured to matingly engage with said at least three inwardly projecting extensions of said first band end, and when said band ends are moved towards each other, said extensions become progressively matingly engaged with each other.

3. A unitary clamp for applying clamping forces to the exterior surface of an object having a generally arcuate cross-sectional configuration, which comprises:
   (a) a flexible band in the form of an open ring having opposed end portions and defining an inner arcuate portion which is at least partially discontinuous;
   (b) a first band end connected to a first end portion of said flexible band, said first band end including at least three inwardly projecting extensions; and
   (c) a second band end connected to the opposite end portion of said flexible band, said second band end including at least two extensions projecting inwardly toward said extensions of said first band end and configured to engage therewith, said inwardly projecting extensions being configured, positioned, and oriented such that when said band ends are moved toward each other, said extensions become engaged with each other in a manner to maintain the clamp in a closed condition whereby said inner arcuate portion of said flexible band assumes a generally circular cross-sectional configuration and contacts the object, and wherein said inwardly projecting extensions of said first band end are positioned in relatively upper, intermediate, and lower spaced positions, the lower position being closest to the center of the flexible band, and the spacing being sufficient to engagingly receive the extensions of said second band end.

4. The clamp according to claim 3 wherein said at least two extensions of said second band end are configured to matingly engage with said at least three inwardly projecting extensions of said first band end, and when said band ends are moved towards each other, said extensions become progressively matingly engaged with each other.

5. A clamp for applying clamping forces to the exterior surface of an object having a generally arcuate cross-sectional configuration, which comprises:
   (a) a flexible band in the form of an open ring having opposed end portions and defining an inner arcuate portion;
   (b) a first band end connected to a first end portion of said flexible band, said first band end including at least three inwardly projecting extensions; and
   (c) a second band end connected to the opposite end portion of said flexible band, sdid second band end including at least two extensions projecting inwardly toward said extensions of said first band end and configured to matingly engage therewith, said inwardly projecting extensions being configured, positioned, and oriented such that when said band ends are moved toward each other, said extensions become progressively matingly engaged with each other in a manner to maintain the clamp in a closed condition whereby said inner arcuate portion of said flexible band assumes a cross-sectional configuration corresponding to the cross-sectional configuration of the object to be clamped and contacts the outer surface thereof, and wherein said inwardly projecting extensions of said first band end are positioned in relatively upper, intermediate, and lower positions, the lower position being closest to the center of the flexible band.

6. The clamp according to claim 5 wherein said inwardly projecting extensions of said second band end are positioned in relatively upper and lower positions, the lower position being closest to the center of the flexible band.

7. A clamp for applying clamping forces to the exterior surface of an object having a generally arcuate cross-sectional configuration, which comprises:
   (a) a flexible band in the form of an open ring having opposed end portions and defining an inner arcuate portion which is at least partially discontinuous;
   (b) a first band end connected to a first end portion of said flexible band, said first band end including at least three inwardly projecting extensions; and
   (c) a second band end connected to the opposite end portion of said flexible band, said second band end including at least two extensions projecting inwardly toward said extensions of said first band end and configured to matingly engage therewith, said inwardly projecting extensions being configured, positioned, and oriented such that when said band ends are moved toward each other, said extensions become progressively matingly engaged with each other in a manner to maintain the clamp in a closed condition whereby said inner arcuate portion of said flexible band assumes a generally circular cross-sectional configuration and contacts the object, and wherein said inwardly projecting extensions of said first band end are positioned in relatively upper, intermediate, and lower positions, the lower position being closest to the center of the flexible band.

8. The clamp according to claim 7 wherein said inwardly projecting extensions of said second band end are positioned in relatively upper and lower positions, the lower position being closest to the center of the flexible band.

9. The clamp according to claim 8 wherein said upper and intermediate extensions on said first band end and said upper and lower extensions on said second band end each include a plurality of teeth on at least one side and said lower extension on said first band end is tapered and toothless.

10. The clamp of claim 9 wherein said plurality of teeth extend along at least a portion of the extensions.

11. The clamp according to claim 9 wherein said teeth are arranged so as to firmly engage each other to maintain the clamp in said closed position.

12. The clamp according to claim 11 wherein the height of said teeth on the upper side of said lower extension of said second band end and the height of said teeth on the lower side of said intermediate extension of said first band end is less than the height of the teeth on said other extensions.

13. The clamp according to claim 12 wherein the heignt of said teeth on the upper side of said lower extension of said second band end and the height of said teeth on the lower side of said intermediate extension of said first band end is less than or approximately one-half the height of the teeth on said other extensions.

14. The clamp according to claim 13 wherein said discontinuity in said inner arcuate surface portion of said flexible band is a indentation.

15. The clamp according to claim 13 wherein said discontinuity in said inner arcuate surface portion of said flexible band is an aperture extending through the band.

16. The clamp according to claim 15 wherein said aperture is elongated and extends approximately from said first end portion of said flexible band to approximately said second end portion of said flexible band.

17. The clamp according to claim 16 wherein said band ends are provided with means for gripping and applying inwardly directed forces to close the clamp.

18. The clamp according to claim 17 wherein said means for gripping said band ends comprises corrugations positioned at opposed locations on said band ends.

19. The clamp according to claim 18 wherein said first band end further comprises means to prevent or resist disengagement of said band ends in a direction perpendicular to the direction of engagement of said extensions of said band ends.

20. The clamp according to claim 19 wherein said means to prevent disengagement of said band ends is a membrane located on one side of at least one band end and extending across said extensions of said band end perpendicular to the axis of the object to be clamped.

21. The clamp according to claim 19 wherein at least one pair of opposed mating surfaces of said extensions is correspondingly tapered in a direction perpendicular to the direction of engagement so as to prevent or resist disengagement of said band ends thereof in a direction parallel to the axial direction of the object to be clamped.

22. The clamp according to claim 21 wherein at least one pair of opposed mating surfaces are toothed.

23. The clamp according to claim 21 wherein at least two pairs of said opposed mating surfaces of said extensions are oppositely tapered to prevent or resist disengagement of said band ends in both directions parallel to the axial direction of the object to be clamped.

24. The clamp according to claim 23 wherein at least one pair of opposed mating surfaces are toothed.

25. The clamp according to any of claim 14 wherein said flexible band and band ends are fabricated of one of plastic and metal.

26. The clamp according to claim 25 wherein said plastic is nylon.

27. A clamp for applying pressure to the exterior surface of an elongated object such as a hose having a generally circular cross section which comprises:
  (a) a flexible band in the form of an open ring having opposed end portions and defining an inner arcuate surface which is at least partially discontinuous,
  (b) a first band end connected to a first end portion of said flexible band, said first band end including at least three inwardly projecting extensions positioned in relatively upper, intermediate, and lower positions, the lowest position being closest to the center of the flexible band; and
  (c) a second band end connected to the opposite end portion of said flexible band, said second band end including at least two inwardly projecting extensions positioned in correspondingly relatively upper and lower positions and configured to matingly engage with said extensions of said first band end, the lower side of said upper extension on said first band end and the upper side of said upper extension on said second band end each having a plurality of teeth, said lower extension on said first band end being tapered and toothless, and said remaining extensions being toothless, said inwardly projecting extensions being configured, positioned, and oriented such that when said band ends are moved toward each other, said extensions and said teeth become progressively matingly engaged with each other in a manner to maintain the clamp in a closed condition whereby said inner arcuate surface is substantially circular for pressure contact with the exterior surface of the elongated object.

28. The clamp of claim 27 wherein said plurality of teeth extend along at least a portion of the extensions.

29. The clamp according to claim 27 further comprising a plurality of teeth on the upper side of said lower extension of said second band end and a plurality of mating teeth on the lower side of said intermediate extension of said first band end.

30. The clamp of claim 29 wherein said plurality of teeth extend along at least a portion of the extensions.

31. The clamp according to claim 29 wherein said teeth are arranged so as to firmly engage each other to maintain the clamp in said closed position.

32. The clamp according to claim 31 wherein said teeth have a generally triangular shape as viewed along the axial direction of the object to be clamped.

33. The clamp according to claim 32 wherein the height of said teeth on the upper side of said lower extension of said second band end and the height of said teeth on the lower side of said intermediate extension of said first band end is less than the height of the teeth on said other extensions.

34. The clamp according to claim 33 wherein the height of said teeth on the upper side of said lower extension of said second band end and the height of said teeth on the lower side of said intermediate extension of said first band end is less than or approximately one-half the height of the teeth on said other extensions.

35. The clamp according to claim 34 wherein said discontinuity in said inner arcuate surface of said flexible band is an indentation.

36. The clamp according to claim 34 wherein said discontinuity in said inner arcuate surface of said flexible band is an aperture extending through the band.

37. The clamp according to claim 36 wherein said aperture is elongated and extends approximately from said first end portion of said flexible band to approximately said second end portion of said flexible band.

38. The clamp according to claim 37 wherein said band ends are provided with means for gripping and applying inwardly directed forces to close the clamp.

39. The clamp according to claim 38 wherein said means for gripping said band ends comprises corrugations positioned at opposed locations on said band ends.

40. The clamp according to claim 39 wherein said first band end further comprises means to prevent or resist disengagement of said band ends teeth in a direction perpendicular to the direction of engagement of said extensions of said band ends.

41. The clamp according to claim 40 wherein said means to prevent disengagement of said band ends is a membrane located on one side of at least one band end and extending across said extensions of said band end perpendicular to the axial direction of the object to be clamped.

42. The clamp according to claim 40 wherein at least one pair of said opposed mating surfaces of said extensions is correspondingly tapered in a direction perpendicular to the direction of engagement so as to prevent or resist disengagement thereof in a direction parallel to the axial direction of the object to be clamped.

43. The clamp according to claim 42 wherein at least one pair of opposed mating surfaces are toothed.

44. The clamp according to claim 40 wherein at least two pairs of said opposed mating surfaces of said extensions are oppositely tapered to prevent or resist disengagement of said band ends in both directions parallel to the axial direction of the object to be clamped.

45. The clamp according to claim 44 wherein at least one pair of opposed mating surfaces are toothed.

46. The clamp according to claim 40 wherein said band further comprises a tear tab to enable said clamp to be removed from the clamped object.

47. The clamp according to claim 46 wherein at least two mating surfaces of oppositely positioned extensions include a guide groove on one surface and a bead or dimple on the mating surface to provide resistance to movement of said band ends in either direction parallel to the axial direction of the object to be clamped.

48. The clamp according to claim 40 wherein said flexible band and band ends are fabricated of one of plastic and metal.

49. The clamp according to claim 48 wherein said plastic is nylon.

50. A clamp for applying pressure to the exterior surface of an elongated object such as a hose having a generally circular cross-section which comprises: (a) a flexible band in the form of an open ring having opposed end portions and defining an inner arcuate surface which is at least partially discontinuous; (b) a first band end connected to a first end portion of said flexible band, said first band end including at least three inwardly projecting extensions positioned in relatively upper, intermediate and lower positions, the lowest position being closest to the center of the flexible band: and (c) a second band end connected to the opposite end portion of said flexible band, said second band end including at least two inwardly projecting extensions positioned in corresponding, relatively upper and lower positions and configured to engage said extensions of said first band end, the lower side of said upper extensions on said first band end add the upper side of said upper extension on said second band end each having a plurality of mating teeth, said lower extension on said first band end being tapered and toothless, the upper side of said intermediate extension of said first band end and the lower side of the upper extension of said second band end each having a plurality of mating teeth, and said lower side of said intermediate extension of said first band end having a plurality of teeth, said lower extension of said second band end being toothless, said inwardly projecting extensions being configured, positioned and oriented such that when said band ends are moved towards each other, said extensions and said mating teeth become progressively matingly engaged with each other in manner to maintain the clasp in a closed condition whereby said inner arcuate surface is substantially circular for pressure contact with the exterior surface of the elongated object.

* * * * *